May 22, 1951     O. J. WARMAN     2,554,353
TUBE CLOSURE
Filed Feb. 20, 1950
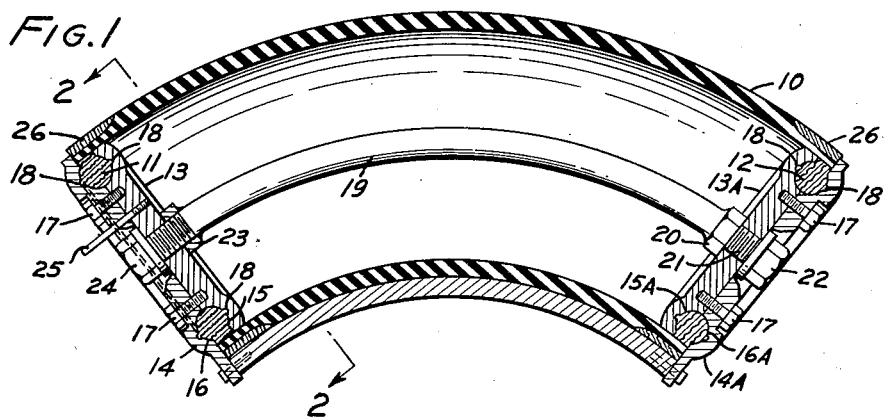
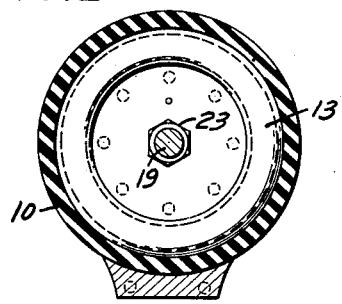
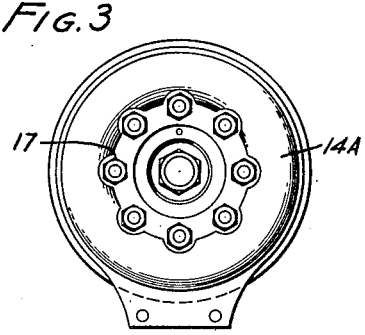
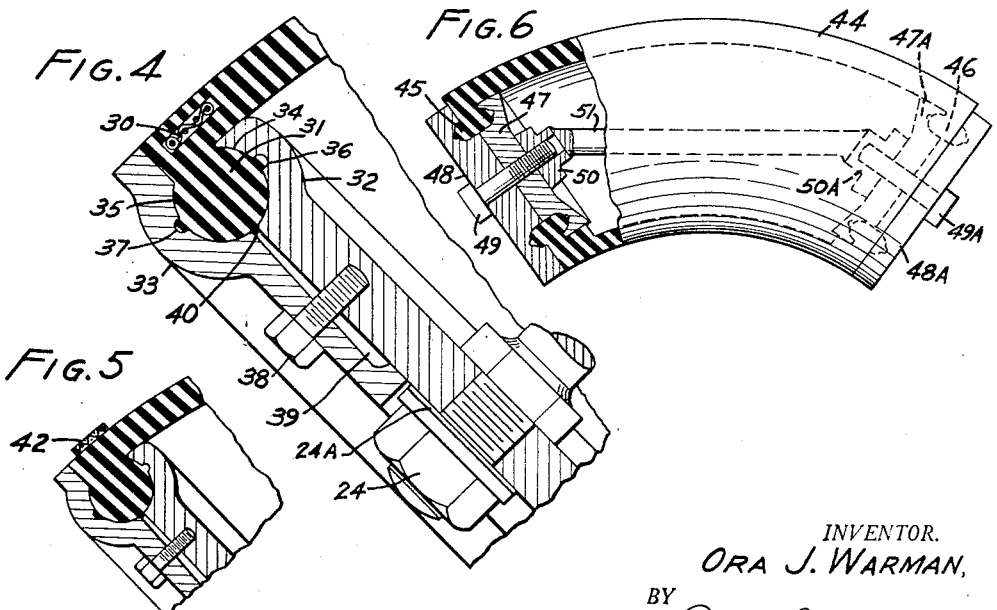
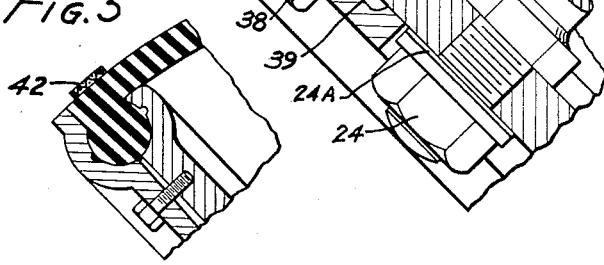
INVENTOR.
ORA J. WARMAN,
BY
James B. Christie
ATTORNEY.

Patented May 22, 1951

2,554,353

UNITED STATES PATENT OFFICE 2,554,353

TUBE CLOSURE

Ora Joseph Warman, South Gate, Calif.

Application February 20, 1950, Serial No. 145,248

11 Claims. (Cl. 18—45)

This invention is concerned with closures for tubes and in its preferred form provides improved end closures for vulcanizing bags and the like.

This application is a continuation-in-part of my co-pending application Serial No. 649,868, filed February 25, 1946, now abandoned.

Vulcanizing bags or cores are employed in repairing tires and the like and generally comprise an elongated arcuate tube adapted to fit within a section of the tire. Both ends of the tube are closed by sealing means such as end plates, and steam is admitted into the core under pressure to distend it and also to heat it and the tire within which it is disposed. It is essential that the end closures make a strong and tight seal with the tube and it is desirable that they be easily and simply installed and removed. The instant invention fulfills these requirements to a greater degree than prior devices and provides simple, rugged and positive seals for a variety of tubular structures.

In accordance with my invention, the tube to be sealed is provided with an under cut annular plastic (and preferably resilient) bead extending around the inside of the tube and bonded thereto, preferably by being formed integrally therewith. For best results, the bead should be undercut on both sides adjacent the tube wall. The bead is clamped between two plates which extend transverse to the tube axis and which are provided with one or more annular grooves which match approximately the contour of the bead. In other words, the plates define a peripheral chamber into which the undercut bead fits, and in which it is squeezed and held tightly when the two plates are clamped together, for example by a bolt extending through the plates. If both sides of the bead are undercut, which is my preferred practice, both plates are provided with grooves, the outside walls of which fit over the undercut part of the bead adjacent the tube wall and thus provide increased seal strength.

The strength of the seal may also be increased by providing a reinforcing band around the tube at the point where the bead is attached. This band may be made of fabric, wire, or metal strip and may be embedded in the tube or disposed around it on the outside.

In the case of a vulcanizing bag, the end plates may be fastened to a rigid arbor which extends longitudinally within the bag from end to end and holds it in the desired arcuate shape when the bag is under pressure from the inside and thus tends to straighten at the same time that its walls are distended.

In my preferred structure, at least one of the grooves in which the undercut bead is clamped is provided with a secondary groove of smaller section. When the plates are clamped together the bead is squeezed into this secondary groove, thus greatly increasing the strength of the seal and avoiding leakage due to nonuniformities in the bead.

These and other aspects of my invention will be understood more thoroughly in the light of the following detailed description, taken in conjunction with the accompanying drawings, in which:

Fig. 1 is a longitudinal view, partly in section, through a vulcanizing bag provided with end closures in accordance with the invention;

Fig. 2 is a cross section taken along the line 2—2 of Fig. 1;

Fig. 3 is an end view of the apparatus of Fig. 1;

Fig. 4 is a fragmentary longitudinal section taken through a modified form of the end closure structure of my invention equipped with an embedded reinforcing band;

Fig. 5 is a fragmentary longitudinal section taken through another modified form of my end closure structure provided with an exterior reinforcing band; and Fig. 6 is a longitudinal view, partly in section, through another type of vulcanizing bag equipped with end closures in accordance with my invention.

The structure illustrated by Figs. 1, 2 and 3 comprises an arcuate flexible heavy walled tube 10 of rubber or some similar elastomer capable of withstanding the pressure and temperature involved in a tire vulcanizing operation. Annular undercut beads 11, 12 are bonded to, and preferably formed integrally with, the tube ends. These beads, like the tube, are of resilient material such as rubber and extend around the inside of the tube ends, being undercut, i. e. of lesser dimension, on both sides adjacent the junction of the beads with the tube wall. In other words, the bead swells away from the junction and is approximately round in section.

The ends of the tube are closed by internal metal plates 13, 13A and external metal plates 14, 14A which extend transversely across the tube. The inside plates fit snugly against the inside walls of the tube. The outside plates overlap the ends. The inside plates have annular grooves 15, 15A on their sides adjacent their edges and shaped to fit the inside of the beads, so that the edges of the plates extend into the undercut portions adjacent the tube wall. Similarly, the outside plates have annular grooves 16, 16A on their sides facing the beads and shaped to fit the outside of the beads. Both inside and outside plates preferably are aluminum castings.

The inside plate at each end is clamped to the adjacent outside plate by cap screws 17 which thread into the inside plate and are tightened by the heads on the exterior surface of the outside plate. The clearance between the plates is such that in bolting them together, the bead is squeezed tightly in the grooves. Preferably, as shown in Fig. 1, each groove is provided with a secondary groove 18 which does not match the uncompressed bead but into which the bead is squeezed when the bolts are tightened, thus increasing the strength of the seal.

The two end closures of the vulcanizing bag of Figs. 1, 2 and 3 are joined by an arcuate arbor 19. One end of the arbor has a collar 20, which abuts the inside plate at this end. A threaded extension 21 of the arbor passes through the inside plate. A nut 22 disposed in an aperture in the outside plate is threaded onto the extension and holds it tightly. The other end of the arbor has a boss or flange 23. A cap screw 24 with its head disposed in an aperture in the outside plate passes through the inside plate and is threaded into a tapped bore in the flange.

Compressed air or steam is fed into the bag through a pipe 25 extending through one end of the structure.

If desired, the end seals may be strengthened by a reinforcing band 26 of wire, fabric, metal strip or the like, extending around the tube and flush with its outer surface.

Fig. 4 illustrates certain modifications in the closure means of Figs. 1, 2 and 3, including an embedded reinforcing band 30 which passes around the tube just outside of the bead 31 and tends to hold the latter from moving outward from the annular clamp formed by the grooved inside and outside plates 32, 33. The main annular grooves 34, 35 in the respective plates are provided with small secondary annular grooves 36, 37 into which portions of the rounded undercut bead are forced when the two plates are clamped together by the action of bolts 38 (one such bolt being shown and the rest being arranged around a bolt circle as shown in Fig. 3). The inner side of the outside plate is cut out to leave an annular gap 39 which permits the bolts to exert the squeezing action on the bead and incidentally to force part of the bead into the outside edge portion 40 of the gap—thus further aiding the sealing action. Near the center, inside and outside plates are in contact with each other to provide a bearing for the annular clamp comprising the bolts and the two plates. The bolt 24 connecting the inner plate to the arbor has a sealing gasket 24A between it and the plate.

Fig. 5 illustrates a structure identical to that of Fig. 4, except that an external reinforcing band 42 is employed.

Fig. 6 illustrates a simplified form of the apparatus of the invention in which the tube or sleeve 44 of a vulcanizing bag is provided with the internal undercut annular beads 45, 46 as in previous cases, except that in section the beads are somewhat different in shape. Thus the bond between the tube and the beads is made thicker and hence stronger. Inside plates 47, 47A and outside plates 48, 48A are employed, with the clamping grooves. However, the plate pairs are clamped together by cap screws 49, 49A which pass through the plates and are threaded into nuts 50, 50A that are in turn welded onto the ends of a straight arbor 51 that passes through the tube.

The beads on the tube may be formed in various ways, including molding the beads and the tubes integrally. However, in some instances it may be desirable to form the beads and the tube separately and then unite them by vulcanizing. In a preferred operation, the beads are formed separately from the tube by building them up of alternate layers of fabric and sheet rubber and subjecting this assembly to compression in an annular mold with an open slot at its outside edge. During compression some of the bead material bulges out of the slot. The end of the tube is then secured around the bulged-out portion, for example by means of an annular clamp and the bulged-out portion of the portion of the bead material are united by vulcanizing. If desired, the bead may be compressed between an inside and outside end plate, with a shim disposed between the two so that the bead will be somewhat bigger than the channel in which it is ultimately squeezed.

The closure of the invention is easy to install and remove. The flexible tube is flattened sufficiently to permit the inside plate to be inserted with its major surfaces running in the direction of the tube axis. Once the plate is inserted, it is turned transverse to the axis and pulled toward the bead. Then the outer plate is laid against the inner plate and the bolts are inserted and tightened.

I claim:

1. In apparatus for closing the end of a tube, the combination which comprises an undercut annular bead of plastic material extending around the end of the tube on the inside and bonded thereto throughout the bead periphery, a first plate disposed across the end of the tube and having an annular groove on its face in which one side of the annular bead is disposed, a second plate disposed across the end of the tube and having an annular groove on its face in which the other side of the annular bead is disposed, at least one of the plates being disposed against an undercut side of the bead, and means for clamping the two plates and squeezing the bead between the grooves to form a tight seal.

2. In apparatus for closing a tube, the combination which comprises an undercut annular bead of plastic material extending transversely around the tube on the inside and bonded thereto throughout the bead periphery, a first plate disposed across the tube on one side of the bead and having an annular groove in which that side of the annular bead is disposed, a second plate disposed across the tube on the other side of the bead and having an annular groove in which the other side of the annular bead is disposed, at least one of the plates being disposed against an undercut side of the bead, and means for clamping the two plates, and squeezing the bead between the grooves to form a tight seal.

3. In apparatus for closing a tube, the combination which comprises an undercut annular bead of plastic material extending internally around the tube on the inside and fastened thereto throughout the bead periphery, a first plate disposed across the tube on one side of the bead and having an annular groove in which one side of the annular bead is disposed, a second plate disposed across the tube on the other side of the bead and having an annular groove in which the other side of the annular bead is disposed, the rim portion of at least one of the plates being disposed against an undercut portion of the bead, means for clamping the two plates and squeezing the bead between the grooves to form a tight seal, and a reenforcing band disposed around the tube adjacent the bead.

4. Apparatus according to claim 3 in which the reenforcing band is embedded in the tube.

5. In apparatus for closing the end of a tube, the combination which comprises an undercut annular bead of plastic material extending around the end of the tube on the inside and fastened thereto throughout the bead periphery, a first plate disposed across the tube and having an annular groove in which one side of the annular bead is disposed, a second plate disposed across the end of the tube and having an annular groove in which the other side of the annular bead is disposed, at least one of the grooves being provided with a smaller annular groove on its surface and extending around it, at least one of the plates having its rim portion disposed adjacent the tube wall and against the undercut portion of the bead, and means for clamping the two plates and squeezing the bead between the grooves to form a tight seal.

6. In apparatus for closing a tube, the combination which comprises an undercut annular bead of plastic material extending transversely around the tube and fastened thereto throughout the bead periphery, a first plate disposed across the tube and having an annular groove in which one side of the annular bead is disposed, a second plate disposed across the tube and having an annular groove in which the other side of the annular bead is disposed, both grooves being provided with smaller annular grooves in their faces and extending around them, at least one of the plates having its rim portion disposed against an undercut portion of the bead, and means for clamping the two plates and squeezing the bead between the grooves to form a tight seal.

7. In a vulcanizing bag having a tube of plastic material provided with end seals, the combination which comprises an undercut annular bead formed integrally with one tube end and extending around the end on the inside, a first plate extending across the tube end and having an annular groove in which one side of the bead is disposed, a second plate extending across the tube end facing the first plate and having another annular groove in which the other side of the bead is disposed, the uncompressed bead being larger in section than the sum of the sections of the grooves, at least one of the plates having its rim portion disposed against an undercut portion of the bead, means for forcing the plates together so that the bead is squeezed in the grooves, a reenforcing ring disposed around the tube end at the bead portion, and means extending through the tube for holding the two plates to the opposite end seal.

8. In closure means for a tube of resilient material, the combination which comprises an undercut annular resilient bead formed integrally with the tube end and extending transversely around the tube on the inside, a first plate extending across the tube and having an annular groove in which one side of the bead is disposed, a second plate extending across the tube facing the first plate and having another annular groove in which the other side of the bead is disposed, the uncompressed bead being larger in section than the sum of the sections of the grooves, at least one of the plates having its rim portion disposed against the undercut portion of the bead, means for forcing the plates together so that the bead is squeezed in the grooves.

9. In a closure means for a tube of plastic material the combination which comprises an undercut resilient annular bead formed integrally with the tube and extending transversely around the tube on the inside, a first plate extending across the tube and having an annular groove in which one side of the bead is disposed, a second plate extending across the tube facing the first plate and having another annular groove in which the other side of the bead is disposed, at least one of the plates having its rim portion disposed against the undercut portion of the bead, the uncompressed bead being larger in section than the sum of the sections of the grooves, means for forcing the plates together so that the bead is squeezed in the grooves and a reenforcing ring disposed around the tube at the bead portion.

10. A tire vulcanizing bag comprising a length of elastic tubing, relatively heavy beads on the inner sides of the ends of said tubing, an arcuate arbor extending centrally through said tubing and having its ends screw threaded, a collar on each end of said arbor at the inner ends of the screw threaded portions thereof, a pair of metal disks centrally apertured and engaged on each of the screw threaded ends of said arbor, oppositely disposed channels of substantially arcuate form in cross-section formed in edge portions of each pair of said disks and adapted to receive said beads therebetween, means for securing the inner of said disks against said collars, and other means for securing the outer of said disks to said inner disks to clampingly secure said beads in said channels.

11. Apparatus according to claim 10 in which each of said outer disks has an aperture therein substantially larger than that of its companion inner disk, and provided with a washer disposed in said aperture, and with the means for securing the outer and inner disks together bearing against the washer.

ORA JOSEPH WARMAN.

REFERENCES CITED

The following references are of record in the file of this patent:

UNITED STATES PATENTS

| Number | Name | Date |
| --- | --- | --- |
| 1,414,091 | Merz | Apr. 25, 1922 |
| 1,676,817 | Burdette | July 10, 1928 |
| 2,331,087 | Warman | Oct. 5, 1943 |
| 2,386,504 | Proaps | Oct. 9, 1945 |